(12) United States Patent
Kehr et al.

(10) Patent No.: US 11,837,923 B2
(45) Date of Patent: Dec. 5, 2023

(54) ROTOR FOR AN ELECTRIC MACHINE AND ELECTRIC MACHINE HAVING A ROTOR

(71) Applicant: ZF Friedrichshafen AG, Friedrichshafen (DE)

(72) Inventors: Ulrich Kehr, Tettnang (DE); Jochen Eggler, Waldburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 39 days.

(21) Appl. No.: 17/568,769

(22) Filed: Jan. 5, 2022

(65) Prior Publication Data
US 2022/0271625 A1     Aug. 25, 2022

(30) Foreign Application Priority Data
Feb. 19, 2021    (DE) ...................... 10 2021 201 610.3

(51) Int. Cl.
*H02K 11/25*      (2016.01)
*B60K 1/00*       (2006.01)

(52) U.S. Cl.
CPC ................ *H02K 11/25* (2016.01); *B60K 1/00* (2013.01); *H02K 2211/03* (2013.01)

(58) Field of Classification Search
CPC ............... H02K 11/25; H02K 2211/03; H02K 11/0094; H02K 11/35; H02J 7/14; H02J 50/10; H02J 50/12; G01D 11/00
USPC ...................................................... 310/68 C
See application file for complete search history.

(56) References Cited

U.S. PATENT DOCUMENTS

| | | | | |
|---|---|---|---|---|
| 6,504,275 B2 * | 1/2003 | Nondahl | ................ | H02K 11/20 310/68 B |
| 2001/0008352 A1 * | 7/2001 | Nondahl | ................ | H02K 11/20 310/68 C |
| 2011/0285256 A1 * | 11/2011 | Hyde | ..................... | H02K 11/20 310/68 R |
| 2015/0233736 A1 * | 8/2015 | Habenschaden | ....... | G01D 5/202 324/207.25 |
| 2015/0349685 A1 * | 12/2015 | Schock | ..................... | H02P 6/20 318/400.11 |

(Continued)

FOREIGN PATENT DOCUMENTS

| | | |
|---|---|---|
| DE | 102006021489 A1 | 11/2007 |
| DE | 102014213446    * | 1/2016 |
| WO | WO 2007/128673 | 11/2007 |

OTHER PUBLICATIONS

RU-2641707 (Year: 2018).*

*Primary Examiner* — Ahmed Elnakib
(74) *Attorney, Agent, or Firm* — Dority & Manning, P.A.

(57) ABSTRACT

A rotor (1) for an electric machine (2) operated with a pulsed voltage, the rotor (1) having at least one sensor element (3) for detecting at least one condition variable of the rotor (1), and a signal processing unit (4) connected to the at least one sensor element (3), the signal processing unit (4) generating measured data based on the at least one condition variable of the rotor (1) and transmitting the measured data to a control device (5). The rotor (1) further having at least one induction coil (7) at least indirectly supported on an end face of the rotor (1), the at least one induction coil (7) being tuned to a modulation of a fundamental wave field of a magnetic front stray field (12) formed during operation of the electric machine (2) with pulsed voltage to generate electrical energy from the fundamental wave field.

15 Claims, 2 Drawing Sheets

(56) References Cited

U.S. PATENT DOCUMENTS

| 2018/0026496 | A1* | 1/2018 | Zhi ........................ | H02K 11/35 |
| | | | | 310/68 B |
| 2022/0271582 | A1* | 8/2022 | Eggler ............... | H02K 11/0094 |
| 2022/0271585 | A1* | 8/2022 | Eggler ................ | H02K 1/2766 |
| 2022/0271625 | A1* | 8/2022 | Kehr ....................... | H02J 50/10 |
| 2022/0271627 | A1* | 8/2022 | Kehr .................. | H02K 11/0094 |

* cited by examiner

ROTOR FOR AN ELECTRIC MACHINE AND ELECTRIC MACHINE HAVING A ROTOR

CROSS-REFERENCE TO RELATED APPLICATION

The present application is related and has right of priority to German Patent Application No. 10 2021 201 610.3 filed on Feb. 19, 2021, the entirety of which is incorporated by reference for all purposes.

FIELD OF THE INVENTION

The invention relates generally to a rotor for an electric machine. The invention further relates generally to an electric machine having a rotor of this type.

BACKGROUND

For example, DE 10 2006 021 489 A1 discloses an electric machine having a stator and a rotor. The electric machine is a permanent-magnet synchronous machine, wherein the rotor includes a rotor body having permanent magnets arranged in the interior of the rotor body as well as flux barriers. The permanent magnets form poles of the electric machine, wherein at least one permanent magnet is arranged in the area of each pole.

In order to be able to optimally operate an electric machine, it is significant, in particular, to determine condition variables of the rotor using sensors and make the condition variables available to a control device of the electric machine. Previously it has been difficult to supply such sensors, which are associated with the rotor of the electric machine and rotate together with the rotor, with sufficient electrical energy.

For example, the continuous power of an electric machine is limited, among other things, by the maximum permissible temperature of the rotor, in particular of the magnets in the case of a permanent-magnet synchronous machine or of the cage of an induction machine. During the operation of the electric machine, the current rotor temperature is generally not known as a measured quantity and is estimated using a temperature model. As a result, an allowance must be made for a safety margin for the maximum temperature, and so the electric machine is not optimally operable due to this safety margin. If the maximum temperature is exceeded, there is a risk of the electric machine overheating and becoming damaged.

SUMMARY OF THE INVENTION

The present invention improves the operation of the electric machine and reduces the risk of the electric machine overheating. Moreover, the rotor is to be easily and quickly installable.

A rotor according to the invention for an electric machine operated with a pulsed voltage is provided. The rotor includes at least one sensor element, which is configured for detecting at least one condition variable of the rotor. The rotor further includes a signal processing unit connected to the at least one sensor element, where the signal processing unit is configured for generating measured data from the detected condition variable of the rotor and transmitting the measured data to a control device. The rotor also includes at least one induction coil, which includes at least one electrical conductor and is arranged at least indirectly on an end face of the rotor. The induction coil is tuned to a modulation of a fundamental wave field of a magnetic front stray field formed during the operation of the electric machine with pulsed voltage, with the induction coil being configured for generating electrical energy from the fundamental wave field.

In other words, the rotor of the electric machine operated with pulsed voltage includes the at least one sensor element, optionally multiple sensor elements, as well as the signal processing unit and the at least one induction coil, including the at least one electrical conductor. In particular, the at least one sensor element, the signal processing unit, and the at least one induction coil are connected to the rotor in a positionally fixed manner and, thereby, rotate together with the rotor.

Preferably, the at least one induction coil is configured for supplying the signal processing unit and/or the at least one sensor element with electrical energy.

Consequently, either the signal processing unit is supplied with electrical energy or the at least one sensor element is supplied with electrical energy or both the signal processing unit as well as the at least one sensor element are supplied with electrical energy.

Advantageously, the pulsed output voltage for the operation of the electric machine is generated by a frequency converter. Using the at least one induction coil, it is possible, during the operation of the electric machine with pulsed voltage, to obtain electrical energy from the fundamental wave field of the magnetic front stray field. This is the case because the fundamental wave field is modulated by the pulsed supply by the frequency converter. The at least one induction coil is tuned to the modulation of the fundamental wave field and, when the rotor is rotating, the changing front stray field flows through the at least one induction coil, as the result of which an electric current or a voltage is induced in the at least one induction coil, which is utilized for supplying electrical energy to the at least one sensor element and/or the signal processing device, which are arranged at the rotor in a rotationally fixed manner and rotate together with the rotor. In this way, collecting rings and batteries for the power supply of the components rotating with the rotor are dispensed with, as the result of which the rotor is easily and quickly installed. Moreover, the generation of electrical energy by the at least one induction coil is not dependent on certain speed ranges of the rotor, because the frequency of the magnetic field is not rigidly coupled to the rotational speed of the rotor. The end-face arrangement of the at least one induction coil at the rotor is particularly advantageous, because, as a result, the at least one induction coil does not engage into the active part of the rotor.

In order to generate the desired torque by the electric machine, the electric machine is supplied with a multiphase, sinusoidal current. Generally, this sinusoidal current is generated by a switching converter, which generates a pulsed, approximately square-wave voltage from a DC voltage intermediate circuit by way of suitable switching processes. Due to a pulse width modulation and a current control, a sinusoidal current is approximated, which, however, contains harmonics in addition to the fundamental component. These harmonics also result in harmonics of the same frequency in the stator magnetic field. As viewed by an observer situated at the rotor, these harmonics appear as temporally variable components, which are superimposed on the fundamental wave field, which is temporally constant as viewed from the rotor or is low-frequency in the case of induction machines. These temporally variable components have the same spatial wavelength as the fundamental wave field and rotate together with the fundamental wave field. In the case of synchronous machines, this is a standing wave as viewed from the rotor. In the case of induction machines, this is a standing wave with respect to the synchronous rotational speed. The wavelength of the fundamental wave corresponds to one pole pitch.

The magnetic front stray field is formed at both end faces of the rotor and has field lines that extend from the stator to the rotor. In particular, the magnetic front stray field is influenced by the winding overhangs of the stator. In a magnetic sense, the field lines in the magnetic circuit are parallel to the field lines in the air gap. As a result, the same modulations are contained in the front stray field that are also present in the air gap field. The geometric direction of the field lines in the front stray field differs, however, from the direction of the field lines in the air gap field. While the field lines in the air gap field extend essentially in a plane perpendicular to the rotor axis, the field lines in the front stray field have an axial component. During a purely sinusoidal supply of the electric machine, the rotating magnetic field in synchronous machines is temporally constant as viewed from the rotor and, in the case of induction machines, is temporally constant as viewed by an observer rotating at the synchronous rotational speed. Due to the pulsed supply of the electric machine by the converter, a temporally variable component is superimposed on this field, however. As a result, a voltage is induced in a coil, which is located in the front stray field and is mechanically fixedly connected to the rotor. Therefore, electrical energy is generated via an induction coil of this type.

The at least one sensor element is arranged directly at the rotor so it immediately detects a condition variable(s) of the rotor, particularly a temperature of the rotor, to reduce the risk of the electric machine overheating. The at least one sensor element is just as suitable for measuring absolute temperatures as it is for detecting temperature differences. For example, the temperature of the rotor is a condition variable of the rotor.

For example, the at least one sensor element is arranged directly at or at least adjacent to the point of origin of the condition variable. A short measuring path between the at least one sensor element and the point of origin of the condition variable increases the measuring accuracy.

Preferably, the energy transmission at least between the at least one induction coil and the at least one sensor element takes place wirelessly, preferably by induction. Alternatively, the at least one sensor element is connected to the at least one induction coil by wiring.

In particular, the signal processing unit is wirelessly connected to the control device for signal transmission and/or data transmission. The at least one sensor element is preferably connected to the signal processing unit via wiring for signal transmission and/or data transmission. For example, the control device is arranged outside the rotor, although within the vehicle.

According to one preferred embodiment of the invention, the at least one induction coil is arranged within a pole at the rotor, wherein a coil width of the at least one induction coil essentially precisely corresponds to one pole pitch.

According to one preferred embodiment of the invention, the at least one induction coil is arranged within a pole at the rotor, wherein a coil width of the at least one induction coil corresponds to at least 50% to 150% of a pole pitch.

In one preferred embodiment, the forward conductor is a section of the coil conductor of the induction coil, which, on the rotor end face, extends essentially in the direction from radially inside toward the outside or from the outside toward the inside. The return conductor is a further section of the coil conductor, which, on the rotor end face, extends essentially in the direction from radially inside toward the outside or from the outside toward the inside. The pole pitch divides the end face into circular segments, wherein each circular segment corresponds to one pole. In the following, the pole pitch is understood as the extension of a circular segment, which is defined in this way, in the circumferential direction. In other words, the pole pitch on the rotor end face corresponds to an angle in a polar coordinate system about the rotor axis. The distance of the forward conductor to the return conductor approximately corresponds to the pole pitch. If the induction coil has multiple windings, the mean distance approximately corresponds to the pole pitch. Preferably, the mean distance of the forward conductors to the return conductors is the 0.5-times to the 1.5-times of the pole pitch.

According to one preferred embodiment of the invention, an axis of the induction coil is formed essentially in parallel to an axis of rotation of the rotor. In other words, the induction coil and the rotor are arranged essentially axially parallel to one another.

According to one preferred embodiment of the invention, the signal processing unit is arranged at least indirectly at an end face of the rotor. Alternatively, or additionally, preferably the at least one sensor element is arranged at least indirectly at an end face of the rotor. An at least indirect arrangement of a component at the rotor is to be understood to mean that this component is arranged at the rotor either directly, i.e., immediately or via a single further component, i.e., indirectly via this further component.

For example, the at least one sensor element is arranged in an area of the rotor that heats up to an extreme extent when the electric machine is loaded. The at least indirect end-face arrangement at least of the signal processing unit, optionally also of the at least one sensor element, is advantageous, since the properties of the rotor, in particular the electrical and magnetic properties of the electric machine, are not negatively influenced. Moreover, the end face of the rotor is particularly readily accessible not only for the installation, but rather also for maintenance, as the result of which the rotor and the elements arranged thereon are easily and quickly installed.

According to one preferred embodiment of the invention, the at least one sensor element is integrated in the signal processing unit. Consequently, the at least one sensor element and the signal processing unit form one single component, which is arranged at the rotor.

According to one preferred embodiment of the invention, the at least one sensor element is arranged in the interior of the rotor. In other words, the at least one sensor element is not arranged on a surface of the rotor, but rather in a recess in the rotor. In particular, the at least one sensor element is arranged in the interior of the rotor in such a way that a point of origin of the condition variable is in close proximity of the sensor element.

According to one preferred embodiment of the invention, the at least one induction coil is arranged on a circuit board. This embodiment is not only particularly easy to install, but rather, it is also optimized for production. A circuit board is to be understood as a printed circuit plate, i.e., a flat element having two relatively large end faces, wherein one of the end faces is placed against the rotor and the other end face is accommodates the induction coil. For example, the conductor is arranged on an end face of the circuit board and is fixedly connected to the circuit board in order to form the induction coil on the circuit board. Preferably, the circuit board is arranged on an end face of the rotor and comes to rest directly at the rotor. For example, the circuit board is fixed at the end face of the rotor by adhesive. Consequently, no further components, but rather optionally only adhesive, are/is arranged between the end face of the rotor and the end face of the circuit board facing the rotor. The adhesive is applied at points, on at least a portion of the surface, or on the entire surface between the rotor and the circuit board. For example, the circuit board is rigid or at least partially flexible and partially rigid, in particular, semi-flexible. A rigid circuit board offers the advantage of high strength and dimensional stability also at high rotational speeds of the rotor.

According to one preferred embodiment of the invention, the signal processing unit is integrated into the circuit board. Consequently, the signal processing unit is a fixed integral part of the circuit board. Due to the integration, separate components are saved.

According to one preferred embodiment of the invention, the conductor of the at least one induction coil is integrated into the circuit board, i.e., is a fixed integral part of the circuit board. In particular, the conductor of the at least one induction coil is printed on the circuit board. Due to the integration, separate components are reduced. Preferably, the conductor of the at least one induction coil includes several teeth formed in the radial direction. For example, the particular tooth of the conductor extends in the circumferential direction over an entire pole pitch or at least 50% of the pole pitch. The teeth are uniformly distributed. For example, the rotor has three pole pairs, wherein the conductor therefore has three teeth, which are arranged extending in the circumferential direction in an area adjacent to an outer circumference of the circuit board. Preferably, the number of teeth of the conductor corresponds to the number of pole pairs of the rotor.

An electric machine according to the invention includes a frequency converter, which is configured for generating a pulsed output voltage for operating the electric machine, a control device for the open-loop control of the electric machine, and a stator and a rotor according to the invention. An air gap is formed between the stator and the rotor. The control device is preferably arranged in the vehicle and is utilized for the open-loop and closed-loop control of the electric machine. In particular, the electric machine is an induction machine. The frequency converter provides, in particular, a pulsed output voltage. The desired periodically alternating current profile is generated by way of a current control in connection with a pulse generation process, for example, by pulse width modulation.

The invention also relates to a vehicle having an electric machine according to the invention. In particular, the vehicle is a motor vehicle, for example, a passenger car, wherein the electric machine is a prime mover of the vehicle that at least partially or completely electrically drives the vehicle. Consequently, the vehicle is preferably a hybrid vehicle or as an electric vehicle.

BRIEF DESCRIPTION OF THE DRAWINGS

Multiple preferred embodiments of the invention are explained in greater detail in the following with reference to the drawings, wherein identical elements are labeled with the same reference character, wherein.

DETAILED DESCRIPTION

Figure 1:
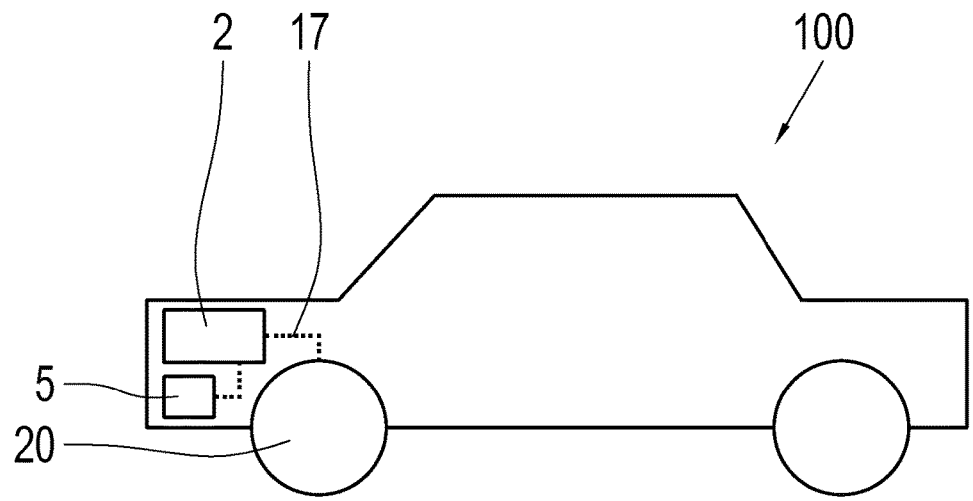
FIG. 1 shows a highly simplified schematic view of a vehicle including an electric machine according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

According to the schematic view of FIG. 1, a vehicle 100 includes an electric machine 2 according to the invention, which is configured for driving the vehicle 100. In the present case, the electric machine 2 is a rotating field motor. For this purpose, the electric machine 2 is drivingly connected, for example, via shafts 17 and, optionally, via further components, to driving wheels 20 of the vehicle 100. Moreover, the electric machine 2 is actuated and operated by a control device 5, which is arranged in the vehicle 100. In particular, the control device 5 is utilized for protecting the electric machine 2 against overheating during the operation, in that the maximum power of the electric machine 2 is adapted to a currently measured temperature of the rotor 1. For this purpose, the control device 5 is connected to the electric machine 2 in a signal-transmitting manner.

Figure 2:
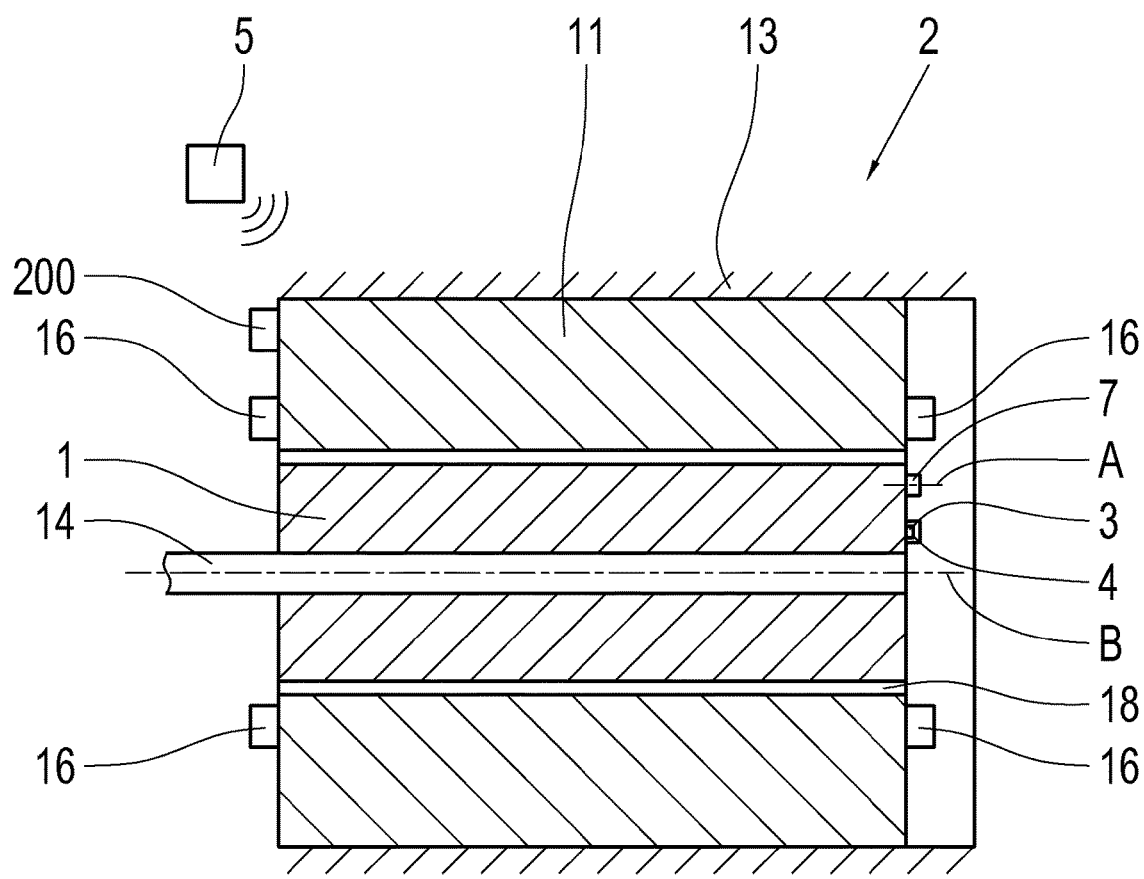
FIG. 2 shows a highly simplified diagrammatic longitudinal section view of the electric machine including a stator and a rotor according to the invention.

FIG. 2 shows a section view of the electric machine 2, which includes a stator 11, a rotor 1, and the control device 5 for the open-loop control of the electric machine 2. Moreover, the electric machine 2 includes a frequency converter 200, which generates a pulsed output voltage for operating the electric machine 2. An air gap 18 is formed between the stator 11 and the rotor 1. The rotor 1 is rotationally fixed to a rotor shaft 14. In a housing 13 of the electric machine 2, a signal processing unit 4 including a sensor element 3 is arranged on an end face of the rotor 1. The sensor element 3 is either integrated into the signal processing unit 4 or, alternatively, the sensor element 3 is arranged in the interior of the rotor 1. Moreover, an induction coil 7 is arranged on an end face of the rotor 1 and is configured for generating electrical energy in order to supply the sensor element 3 and the signal processing unit 4 with electrical energy. An axis A of the induction coil 7 is essentially in parallel to an axis of rotation B of the rotor 1. The stator 11 has a stator body, as a stator laminated core, multiple coils accommodated by the stator body, and winding overhangs 16 protruding axially from the stator 11 on both sides. The rotor 1 has a rotor body, which is a rotor laminated core, and multiple permanent magnets arranged in the interior of the rotor body.

The sensor element 3 measures a temperature at the rotor 1 as a condition variable of the rotor 1 and transmits this condition variable to the signal processing unit 4. Optionally, multiple sensor elements 3 are arranged at the rotor 1, which detect, for example, different condition variables of the rotor 1. The signal processing unit 4 generates measured data from the detected condition variables of the rotor 1 and transmits the measured data to the control device 5 installed in the vehicle 100. The control device 5 is connected to the signal processing device 4 at the rotor 1 wirelessly, for example, via radio, and is configured for actuating the electric machine 2 under consideration of demands of a driver as well as operating parameters of the electric machine 2, in particular, operating parameters and/or condition variables of the rotor 1.

Figure 3:
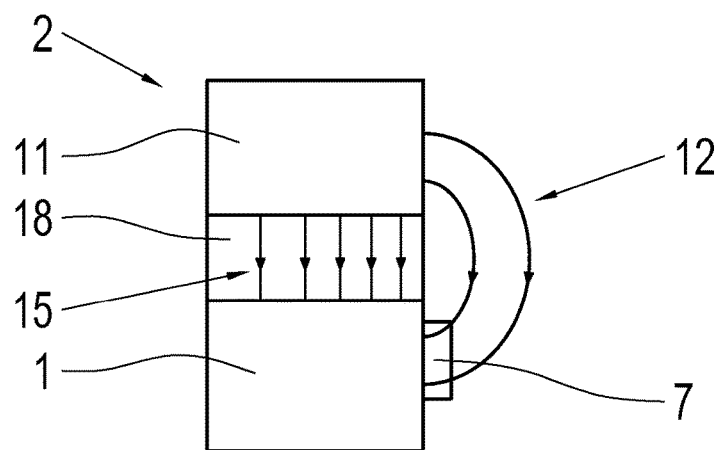
FIG. 3 shows a partial schematic view of a section of the electric machine shown in FIG. 2 according to the invention.

FIG. 3 shows an enlarged, partial section view of the electric machine 2 in FIG. 2, which is operated with a pulsed voltage. The rotor 1 is rotatably arranged in the interior of the stator 11, wherein the air gap 18 is formed between the stator 11 and the rotor 1. In the air gap 18, a magnetic field 15 is formed between an inner circumferential surface of the stator 11 and an outer circumferential surface of the rotor 1. Moreover, a magnetic front stray field 12 is also formed on an end face from the stator 11 to the rotor 1. The induction coil 7 is tuned to a modulation of a fundamental wave field of the magnetic front stray field 12 formed during the operation of the electric machine 2 with pulsed voltage and is configured for generating electrical energy from the fundamental wave field of the magnetic front stray field 12, and supplies the sensor element 3 and the signal processing unit 4 with this electrical energy. Alternatively, further induction coils 7 are arranged at the rotor 1 for generating electrical energy from the temporally changing magnetic front stray field 12.

Figure 4:
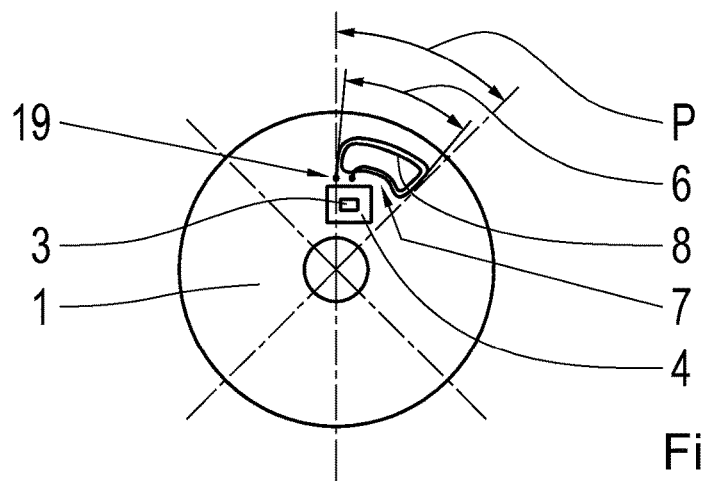
FIG. 4 shows a highly simplified diagrammatic side view of the rotor according to FIGS. 2 and 3.

FIG. 4 shows the end face of the rotor 1 shown in FIGS. 2 and 3. The stator is not shown. The induction coil 7 is arranged within a pole at the rotor 1, wherein a coil width 6 of the induction coil 7 essentially precisely corresponds to a pole pitch P. In the present case, the rotor 1 has three pole pairs, i.e., a total of 6 poles. The coil width 6 indicates the distance in the circumferential direction between the opposite conductor sections of the conductor 8 of the induction coil 7. The signal processing unit 4 is arranged directly on an end face of the rotor 1, wherein the sensor element 3 is integrated into the signal processing unit 4. The induction coil 7 is connected via an electrical line 19 to the signal processing unit 4 and the sensor element 3 integrated therein. In order to convert the alternating current to direct current and provide the direct current for the sensor element 3, the signal processing unit 4 has, for example, an oscillating circuit (not represented in greater detail, but generally known), a rectifier, and a capacitor.

Figure 5:
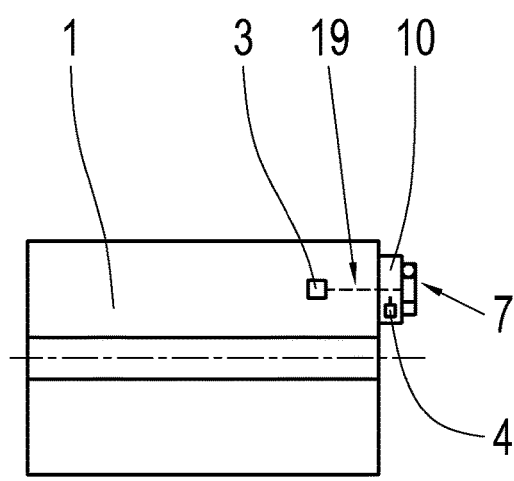
FIG. 5 shows a highly simplified diagrammatic longitudinal sectional view of a second exemplary embodiment of the rotor.

In FIG. 5, a section view of a second embodiment of the rotor 1 is represented. In the present case, the induction coil 7 is arranged on a circuit board 10, wherein the circuit board 10 is arranged on an end face of the rotor 1 and comes to rest directly at the rotor 1. An adhesive between the circuit board 10 and the rotor 1 fixes the circuit board 10 on an end face of the rotor 1. In the present case, the circuit board 10 is arranged within a pole at the rotor 1. The signal processing unit 4 is integrated into the circuit board 10 and the sensor element 3 is arranged in the interior of the rotor 1. The signal processing unit 4, the sensor element 3, and the induction coil 7 are operatively connected to each other via electrical lines 19.

Figure 6:
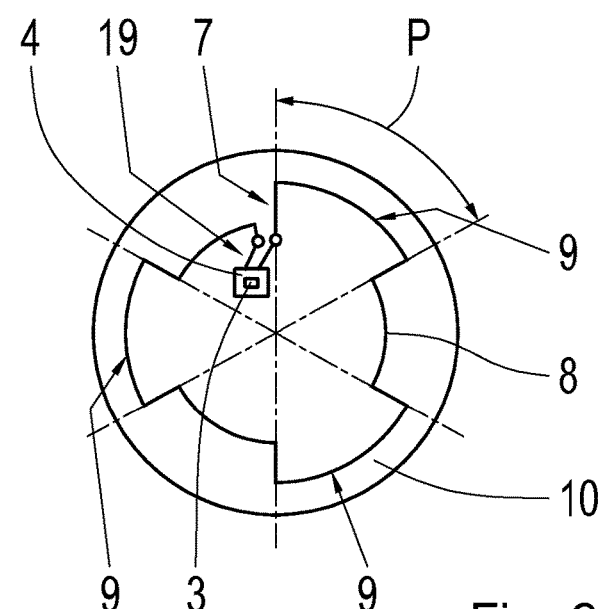
FIG. 6 shows a highly simplified diagrammatic side view of a third exemplary embodiment of the rotor.

FIG. 6 shows a side view of a third embodiment of the rotor 1, wherein only the end face of a circuit board 10 arranged thereon is visible in the present case. In contrast to the circuit board 10 according to FIG. 5, according to the third embodiment of the rotor 1, the conductor 8 of the induction coil 7 is integrated into the circuit board 10, which is a printed strip conductor in the present case. The conductor 8 extends in the circumferential direction and not overlapping, in an area adjacent to an outer circumference of the circuit board 10. Moreover, the conductor 8 includes three teeth 9 in the radial direction. All teeth 9 are identical and distributed uniformly in the circumferential direction, wherein each tooth 9 is arranged within a pole at the rotor 1 and extends such that its dimension essentially precisely corresponds to one pole pitch P. In the present case, the rotor 1 has three pole pairs, i.e., a total of 6 poles. The signal processing unit 4 is integrated, together with the sensor element 3, into the circuit board 10. The signal processing unit 4 and the induction coil 7 are operatively connected to each other via electrical lines 19. The diameter of the circuit board 10 essentially corresponds to the diameter of the rotor 1.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 rotor
2 electric machine
3 sensor element
4 signal processing unit
5 control device
6 coil width
7 induction coil
8 electrical conductor
9 tooth
10 circuit board
11 stator
12 front stray field
13 housing
14 rotor shaft
15 magnetic field in the air gap
16 winding overhang
17 shaft
18 air gap
19 electrical line
20 driving wheel
100 vehicle
200 frequency converter
A axis of the induction coil
B axis of rotation of the rotor
P pole pitch

The invention claimed is:

1. A rotor (1) for an electric machine (2) operated with a pulsed voltage, the rotor (1) comprising:
   at least one sensor element (3) for detecting at least one condition variable of the rotor (1);
   a signal processing unit (4) connected to the at least one sensor element (3), the signal processing unit (4) generating measured data based at least in part on the at least one condition variable of the rotor (1) and transmitting the measured data to a control device (5); and at least one induction coil (7) including at least one electrical conductor (8), the at least one induction coil (7) being at least indirectly supported on an end face of the rotor (1), the at least one induction coil (7) being tuned to a modulation of a fundamental wave field of a magnetic front stray field (12) formed during operation of the electric machine (2) with pulsed voltage to generate electrical energy from the fundamental wave field, wherein the at least one induction coil (7) is within a pole at the rotor (1), wherein a coil width (6) of each of the at least one induction coil (7) is equal to 50% to 150% of one pole pitch (P).

2. The rotor (1) of claim 1, wherein the at least one induction coil (7) supplies the electrical energy to one or more of the signal processing unit (4) and the at least one sensor element (3).

3. The rotor (1) of claim 1, wherein an axis (A) of each of the at least one induction coil (7) is parallel to an axis of rotation (B) of the rotor (1).

4. The rotor (1) of claim 1, wherein the signal processing unit (4) is at least indirectly supported on an end face of the rotor (1).

5. The rotor (1) of claim 1, wherein the at least one sensor element (3) is at least indirectly supported on an end face of the rotor (1).

6. The rotor (1) of claim 1, wherein the at least one sensor element (3) is integrated into the signal processing unit (4).

7. The rotor (1) of claim 1, wherein the at least one induction coil (7) is supported on a circuit board (10).

8. The rotor (1) of claim 7, wherein the circuit board (10) is directly against an end face of the rotor (1).

9. The rotor (1) of claim 8, wherein the circuit board (10) is fixed at the end face of the rotor (1) by adhesive.

10. The rotor (1) of claim 7, wherein the signal processing unit (4) is integrated into the circuit board (10).

11. The rotor (1) of claim 7, wherein a conductor (8) of the at least one induction coil (7) is integrated into the circuit board (10).

12. The rotor (1) of claim 1, wherein the at least one condition variable is a temperature of the rotor (1).

13. An electric machine (2), comprising:
a frequency converter (200) for generating a pulsed output voltage for operating the electric machine (2),
the control device (5) for open-loop control of the electric machine (2),
a stator (11), and
the rotor (1) of claim 1.

14. A rotor (1) for an electric machine (2) operated with a pulsed voltage, the rotor (1) comprising:
at least one sensor element (3) for detecting at least one condition variable of the rotor (1);
a signal processing unit (4) connected to the at least one sensor element (3), the signal processing unit (4) generating measured data based at least in part on the at least one condition variable of the rotor (1) and transmitting the measured data to a control device (5); and
at least one induction coil (7) including at least one electrical conductor (8), the at least one induction coil (7) being at least indirectly supported on an end face of the rotor (1), the at least one induction coil (7) being tuned to a modulation of a fundamental wave field of a magnetic front stray field (12) formed during operation of the electric machine (2) with pulsed voltage to generate electrical energy from the fundamental wave field,
wherein the at least one induction coil (7) is within a pole at the rotor (1), wherein a coil width (6) of each of the at least one induction coil (7) is precisely equal to one pole pitch (P).

15. A rotor (1) for an electric machine (2) operated with a pulsed voltage, the rotor (1) comprising:
at least one sensor element (3) for detecting at least one condition variable of the rotor (1);
a signal processing unit (4) connected to the at least one sensor element (3), the signal processing unit (4) generating measured data based at least in part on the at least one condition variable of the rotor (1) and transmitting the measured data to a control device (5); and
at least one induction coil (7) including at least one electrical conductor (8), the at least one induction coil (7) being at least indirectly supported on an end face of the rotor (1), the at least one induction coil (7) being tuned to a modulation of a fundamental wave field of a magnetic front stray field (12) formed during operation of the electric machine (2) with pulsed voltage to generate electrical energy from the fundamental wave field,
wherein the at least one induction coil (7) is supported on a circuit board (10),
wherein a conductor (8) of the at least one induction coil (7) is integrated into the circuit board (10), and
wherein the conductor (8) of the at least one induction coil (7) includes multiple teeth (9) formed in a radial direction.

\* \* \* \* \*